K. Curtiss,
Wood Auger.
N°14,752.    Patented Apr. 22, 1856.
Witnesses
E. S. Woodford
Haldah Woodford
Inventor.
Helsey Curtiss

UNITED STATES PATENT OFFICE.

KELSEY CURTISS, OF WINCHESTER, CONNECTICUT, ASSIGNOR TO THE WINSTED AUGER COMPANY.

IMPROVED AUGER.

Specification forming part of Letters Patent No. 14,752, dated April 22, 1856.

*To all whom it may concern:*

Be it known that I, KELSEY CURTISS, of Winchester, Litchfield county, and State of Connecticut, have invented a new and Improved Mode of Making or Forming Augers and Auger-Bits for Boring Wood; and I hereby declare that the following is a full and complete description of the same, reference being had to the annexed drawing, making a part of the specification, in which—

A is a perspective view of the auger. The small screw on the end of the auger which guides and draws it into the wood is not a continuation of the large screw or twist of the auger, but is independent of and separated from it by a bar marked $a$, about the size of the small screw, more or less. In consequence of this bar, upon which no screw is cut, the cutters or lips of the auger are left free to enter the wood, boring it more rapidly and much easier than when the screw and the large twist of the auger are connected. I call it the "Independent Screw-Auger."

What I claim as my invention, and desire to secure by Letters Patent, is—

The making of an extension-bar connecting the small screw on the end of the auger or bit with the lips or cutters of the auger proper.

Winchester, February 12, 1856.

KELSEY CURTISS.

Witnesses:
    E. S. WOODFORD,
    HULDAH WOODFORD.